(12) United States Patent
Rohl et al.

(10) Patent No.: US 8,033,202 B2
(45) Date of Patent: Oct. 11, 2011

(54) APPARATUS AND METHOD FOR CUTTING ELECTRODE FOIL LAYERS

(75) Inventors: James Rohl, Prescott, WI (US); Michael Rebrovich, Lino Lakes, MN (US); Gregory J. Sherwood, North Oaks, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 767 days.

(21) Appl. No.: 10/731,882

(22) Filed: Dec. 9, 2003

(65) Prior Publication Data
US 2005/0120548 A1  Jun. 9, 2005

(51) Int. Cl.
*B26D 1/00* (2006.01)
(52) U.S. Cl. .................... 83/13; 83/169; 83/684
(58) Field of Classification Search ............ 83/684–691, 83/169, 149, 164, 165, 22, 24, 40, 168, 929.2
See application file for complete search history.

(56) References Cited

U.S. PATENT DOCUMENTS

| | | | |
|---|---|---|---|
| 1,471,669 A * | 10/1923 | Miller | 72/45 |
| 1,734,024 A | 10/1929 | Wright | |
| 2,821,156 A * | 1/1958 | Lyon | 72/43 |
| 3,288,715 A * | 11/1966 | Klint et al. | 72/42 |
| 3,550,491 A | 12/1970 | Wingard | |
| 3,710,666 A | 1/1973 | Keyes et al. | |
| 3,724,247 A | 4/1973 | Page | |
| 3,800,643 A * | 4/1974 | Scott et al. | 83/100 |
| 3,980,541 A | 9/1976 | Aine | |
| 4,052,249 A | 10/1977 | Bruce et al. | |
| 4,225,553 A | 9/1980 | Hirota et al. | |
| 4,361,020 A | 11/1982 | Hirota et al. | |
| 4,413,500 A | 11/1983 | Myer | |
| 4,425,829 A | 1/1984 | Kranik et al. | |
| 4,609,597 A | 9/1986 | Plasse | |
| 4,627,256 A | 12/1986 | Myer | |
| 4,631,020 A | 12/1986 | Frankenberg et al. | |
| 4,756,717 A | 7/1988 | Sturgis et al. | |
| 4,821,614 A | 4/1989 | Fleet et al. | |
| 4,872,381 A | 10/1989 | Stroms | |
| 4,977,804 A | 12/1990 | Naito | |
| 5,214,991 A | 6/1993 | Shimizu et al. | |
| 5,226,226 A | 7/1993 | Fierkens | |
| 5,230,712 A | 7/1993 | Matthews | |
| 5,241,991 A | 9/1993 | Iorio | |
| 5,259,225 A | 11/1993 | Koch | |
| 5,325,583 A | 7/1994 | Shimizu et al. | |
| 5,361,660 A * | 11/1994 | Tsubota | 83/55 |
| 5,660,737 A | 8/1997 | Elias et al. | 216/6 |

(Continued)

OTHER PUBLICATIONS

3M, Fluorinert Electronic Liquid FC-43, May 2000.*

(Continued)

*Primary Examiner* — Phong H Nguyen
(74) *Attorney, Agent, or Firm* — Schwegman, Lundberg & Woessner, P.A.

(57) ABSTRACT

A punch and die apparatus and a method and apparatus for punching a capacitor electrode layer. A method includes placing a capacitor material sheet between a punch and a die, the punch guided by a punch guide, there being no stripper plate between the punch guide and the die, and actuating the punch to punch an electrode layer out of the sheet. An apparatus includes a die having a die hole, a punch guide, and a punch located within the punch guide. The punch guide and the die have a fixed distance therebetween such that there is no compression on a work piece placed between the die and the punch before the punch contacts the workpiece.

13 Claims, 10 Drawing Sheets

U.S. PATENT DOCUMENTS

| | | | |
|---|---|---|---|
| 5,678,439 A * | 10/1997 | Dunwoody et al. | 72/45 |
| 5,775,060 A | 7/1998 | Ferrero | |
| 5,791,217 A | 8/1998 | Dundas et al. | |
| 5,922,215 A | 7/1999 | Pless et al. | 216/6 |
| 6,006,133 A | 12/1999 | Lessar et al. | 607/5 |
| 6,042,624 A | 3/2000 | Breyen et al. | 29/25.03 |
| 6,113,753 A | 9/2000 | Washburn | |
| 6,120,015 A | 9/2000 | Albright et al. | |
| 6,207,001 B1 | 3/2001 | Steidinger et al. | |
| 6,409,776 B1 | 6/2002 | Yan et al. | 29/25.03 |
| 6,447,175 B1 | 9/2002 | Ogawa | |
| 6,550,987 B2 | 4/2003 | Ogawa | |
| 6,571,126 B1 | 5/2003 | O'Phelan et al. | 607/5 |
| 6,603,654 B2 | 8/2003 | Rorvick | 361/503 |
| 6,678,559 B1 | 1/2004 | Breyen et al. | 607/5 |
| 6,699,265 B1 | 3/2004 | O'Phelan et al. | 607/1 |
| 6,763,749 B2 | 7/2004 | Droste et al. | |
| 6,772,663 B2 | 8/2004 | Machamer | |
| 2002/0186977 A1 | 12/2002 | Ogawa | |
| 2005/0220926 A1 | 10/2005 | Naito et al. | |
| 2008/0053185 A1 | 3/2008 | Morgan et al. | |

OTHER PUBLICATIONS

"U.S. Appl. No. 11/468,666, Restriction Requirement mailed Jan. 21, 2009", 8 pgs.

"U.S. Appl. No. 11/468,666, Non-Final Office Action mailed May 11, 2009", 8 pgs.

"U.S. Appl. No. 11/468,666, Non-Final Office Action mailed May 11, 2009", 8 pgs.

"U.S. Appl. No. 11/468,666, Response filed Jan. 8, 2009 to Restriction Requirement mailed Dec. 8, 2008", 9 pgs.

"U.S. Appl. No. 11/468,666, Response filed Feb. 23, 2009 to Restriction Requirement mailed Jan. 21, 2009", 8 pgs.

"U.S. Appl. No. 11/468,666, Response filed Aug. 10, 2009 to Non Final Office Action mailed May 11, 2009", 10 pgs.

"U.S. Appl. No. 11/468,666, Restriction Requirement mailed Jan. 21, 2009", 8 pgs.

"U.S. Appl. No. 11/468,666, Examiner Interview Summary mailed Jan. 21, 2009", 3 pgs.

"U.S. Appl. No. 11/468,666, Examiner Interview Summary mailed Sep. 8, 2010", 3 pgs.

"U.S. Appl. No. 11/468,666, Final Office Action mailed Nov. 12, 2009", 9 pgs.

"U.S. Appl. No. 11/468,666, Final Office Action mailed Nov. 24, 2010", 17 pgs.

"U.S. Appl. No. 11/468,666, Non-Final Office Action mailed Jun. 8, 2010", 13 pgs.

"U.S. Appl. No. 11/468,666, Response filed Oct. 6, 2010 to Non-Final Office Action mailed Jun. 8, 2010", 13 pgs.

"U.S. Appl. No. 11/468,666, Response filed Feb. 10, 2010 to Final Office Action mailed Nov. 12, 2009", 10 pgs.

"U.S. Appl. No. 11/468,666, Response filed Mar. 24, 2011 to Final Office Action mailed Nov. 24, 2010", 14 pgs.

* cited by examiner

APPARATUS AND METHOD FOR CUTTING ELECTRODE FOIL LAYERS

FIELD OF THE INVENTION

This invention relates to the field of punch and dies, and more specifically to a method and apparatus for punching a foil electrode layer.

BACKGROUND

Punch and dies can be used for cutting electrode foils. For example, a flat capacitor includes a plurality of alternating cathodes and anodes separated by separator layers. The cathode and anode layers are cut out of a foil substrate. For example, the anode layers can be formed from a brittle, etched, aluminum foil. It can be difficult to form high quality anode and cathode layers.

SUMMARY

One aspect includes placing an electrode sheet between a punch and a die, and actuating the punch to punch an electrode layer out of the sheet without applying any compression forces on the sheet before the punch contacts the sheet.

One aspect includes placing an electrode sheet between a punch and a die and delivering a lubricant to a periphery of the die hole of the die. The lubricant is concentrated to a predetermined location on the periphery of the die hole.

One aspect includes providing a punch having a punch surface having a compound shear angle relative to a die hole, placing a sheet between the punch and the die hole, and actuating the punch to punch an electrode layer out of the sheet. The compound shear angle is oriented to allow the punch surface to first meet the sheet at a low-pressure point and also leave the sheet at a low-pressure point.

One aspect includes an apparatus comprising a die having a die hole, a punch aligned with the die hole and having a punch surface facing the first side of the die, and a pick-up member to retrieve a part from the punch surface on the second side of the die.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
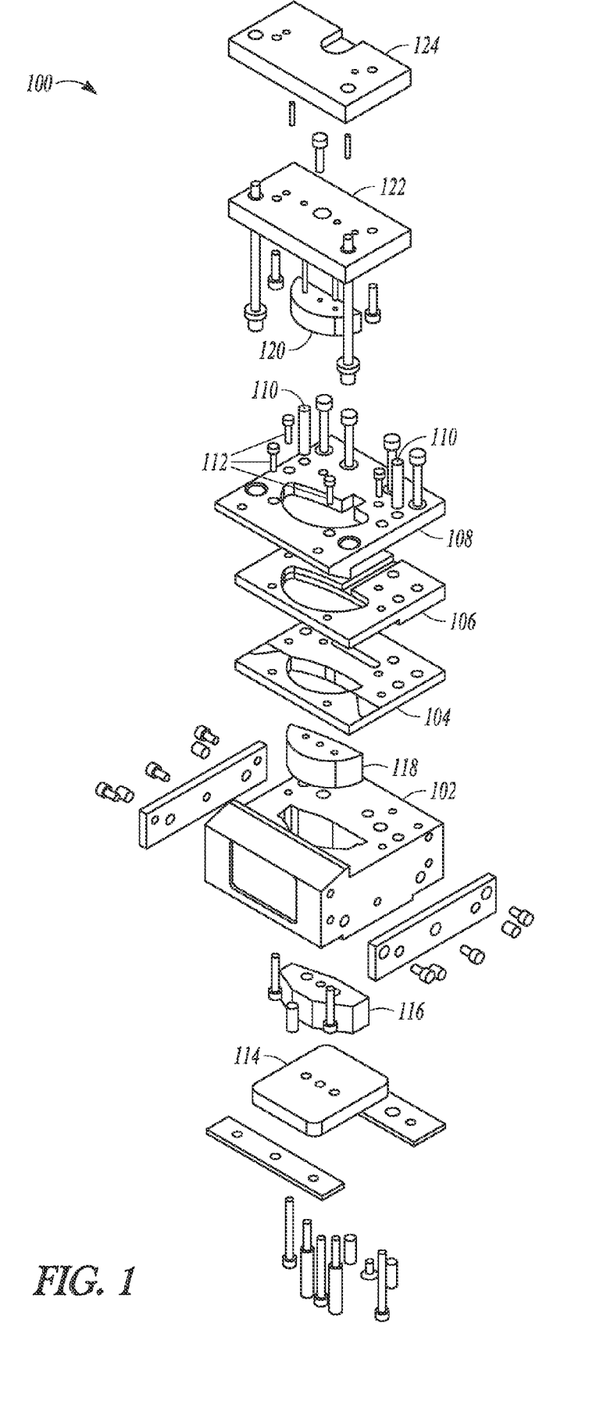
FIG. 1 is an exploded view of a punch and die set according to one embodiment.
Figure 2:
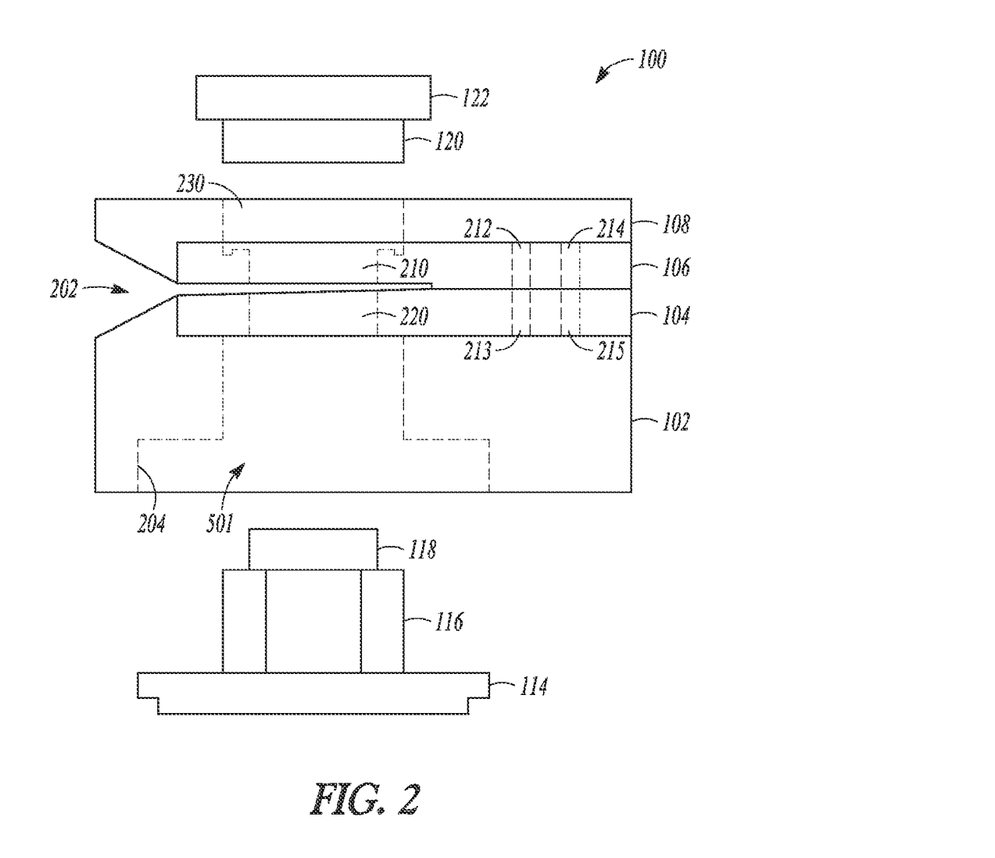
FIG. 2 shows a side view of the punch and die set of FIG. 1.

FIG. 1 shows an exploded view of a punch and die set 100 according to one embodiment. FIG. 2 shows a side view of punch and die set 100. Punch and die set 100 includes a punch holder 102 and a punch guide 104 coupled to the punch holder. Set 100 includes a die 106 coupled to a die holder 108. These members 102, 104, 106, and 108 are aligned to one another and held together by dowels 110 and fasteners 112.

Punch and die set 100 also includes a punch base 114, a punch block 116, and a punch 118. Set 100 includes vacuum block 120, vacuum manifold 122, and vacuum block clamp 124.

In one embodiment, to form punch guide and die set 100, members 104 and 106 are formed of a single block of base material. For example, referring to FIG. 2, members 104 and 106 can originally be a single block of material. The members 104 and 106 are formed by first forming a first hole in the block of material which defines holes 210 and 220, respectively in the two halves, and also forming at least two guide holes in the block of material which later define guide holes 212, 213 and 214, 215 in members 104 and 106.

The block is then separated into punch guide section 104 and die section 106 along line 216 such that punch guide section 104 includes hole 210 of the originally formed first hole and section 104 also includes guide holes 212 and 214. Conversely, die 106 includes hole 220 of the original first hole and second guide holes 213 and 215. At least some of the material from a face of one of the punch guide section 104 or the die 106 is removed to form gap 202. The punch guide section 104 and the die section 106 are coupled together through the guide holes 212, 213 and 214, 215 such that hole portion 210 of die 106 directly opposes hole portion 220 of punch guide 104 across gap 202 formed by the removal of the material.

In one embodiment, a wire cut electrical discharge machining process (Wire EDM) can be used to form the original hole in the original block of material. Wire EDM can achieve a tolerance of +/−0.000050" to +/−0.000200". By using tight tolerance machining and using a single block of material to form the holes 210 and 220, the present system can control the punch 118 with clearances 0.000050 to 0.000200" to die 106. The tolerance may vary because of the EDM equipment used. In contrast, past techniques using bearing guided die sets adds error to the system since the minimum clearances between the punch and die are limited by the tolerances of the equipment that manufactures the tooling pieces. As will be further detailed below, the present system utilizes punch block 116 to guide punch 118 into punch guide 104.

In one embodiment, punch guide 104 and die 106 are formed of a carbide. In one embodiment, the carbide punch and the carbide die can have a hardness of approximately 90 to approximately 100 Rockwell C hardness. This provides an improved cycle life of the die and punch when used for cutting aluminum oxide, for example. High capacitance foil can be very brittle due to an increased amount of $Al_2O_3$. For instance, it was found that a change from 55 Rockwell C hardness to approximately 90-100 Rockwell C hardness increased the punch and die life-cycle from about 3,000 cycles to about 75,000 cycles.

Figure 3A:
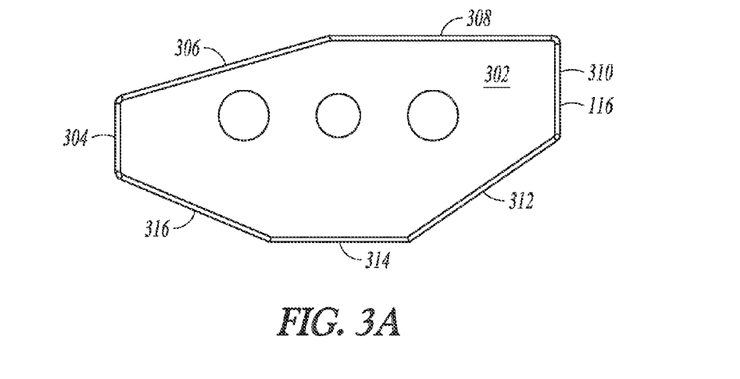
FIGS. 3A and 3B shows a top and side view of a punch block according to one embodiment.
Figure 3B:
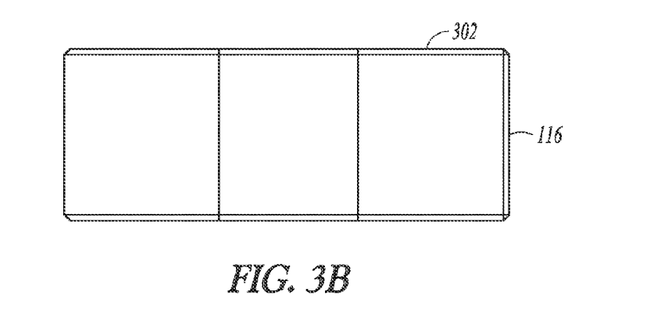

FIGS. 3A and 3B show a top view and side view of punch block 116, according to one embodiment. Punch block 116 includes a top surface 302 and three or more side surfaces 304, 306, 308, 310, 312, 314, and 316. Punch 118 (FIG. 1) is mounted to top surface 302 of the punch block. Sides surfaces 304-316 align with the side surfaces of the lower portion of punch holder 102 (See FIG. 2), as will be discussed below. In one embodiment, punch block 116 can be made of stainless steel.

Figure 4A:
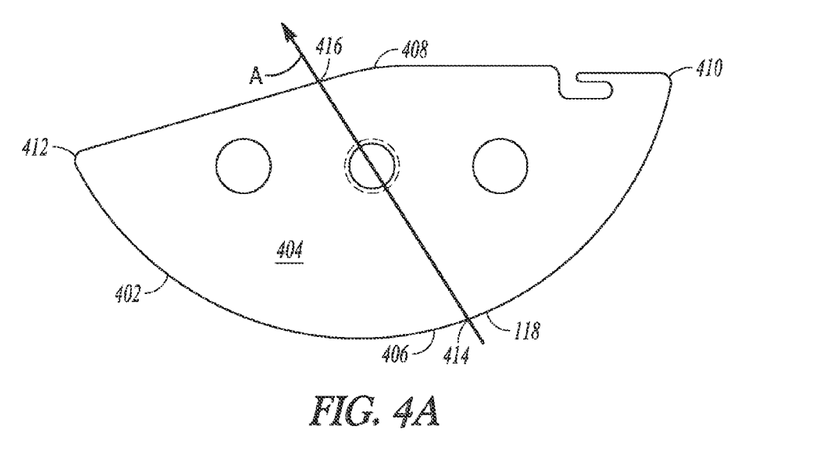
FIGS. 4A and 4B shows a top and side view of a punch according to one embodiment.
Figure 4B:
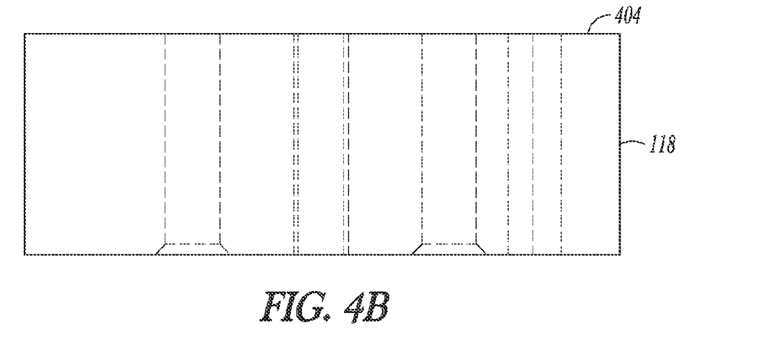

FIGS. 4A and 4B show a top view and a side view respectively of punch 118. In one embodiment, punch 118 is formed of a carbide, as noted above. Punch 118 includes an outer periphery 402 defining the shape of the final punched electrode. Outer periphery 402 can include different shapes depending on the shape of electrode desired. In this example, the perimeter of punch 118 defines a D-shaped capacitor layer having a tab section proximate corner 410.

In one embodiment, punch 118 includes a punch surface 404 having a substantially planar material contact surface which has a compound shear angle relative to the die hole. This means the surface has a slope oriented in both of the two horizontal dimensions. For example, one embodiment provides a compound shear angle having a slope of about 0.006 with the slope oriented as shown by arrow A in FIG. 4A. In various embodiments, the slope can be between 0.006 and 0.018. In some embodiments, the slope can be as low as 0.001. Punch surface 404 can be shaped such that the surface periphery 402 includes at least two relatively large radii 406 and 408 and at least two relatively small radii 410 and 412. The compound shear angle of the punch surface 404 is oriented such that the highest point 414 on punch surface 404 is located along larger radii 406 and the lowest point 416 on the surface is located along the other larger radii 408.

When punching an electrode layer out of a sheet of material, high stress points develop around radii 410 and 412, while there is less stress around large radii 406 and 408. The present compound shear angle allows the punch surface to first meet the material at a low-pressure point 414 and leave at a low-pressure point 416. Thus, when forming an electrode layer for a flat capacitor, one method of use includes placing a sheet between punch 118 and a die 106, the punch 118 having a punch surface 404 having a compound shear angle. The method includes striking the sheet with the punch such that the punch surface 404 enters and exits the sheet at relatively low stress points at an interface between the sheet and the punch surface 404. This prevents or reduces cracking and chipping of the punched material.

In other embodiments, the compound shear angle can be oriented such that it defines a surface that does not enter or exit the material being cut at a small radius of the punch surface. In other words, the surface enters and exits the material at larger radii such that the stress is minimized. In some embodiments, when cutting a less brittle material (a cathode, for example), the compound shear angle can have a slope of about 0.018 or less. In one embodiment, the die hole can have the compound shear angle as described above and the punch surface can be a flat surface.

Figure 5:
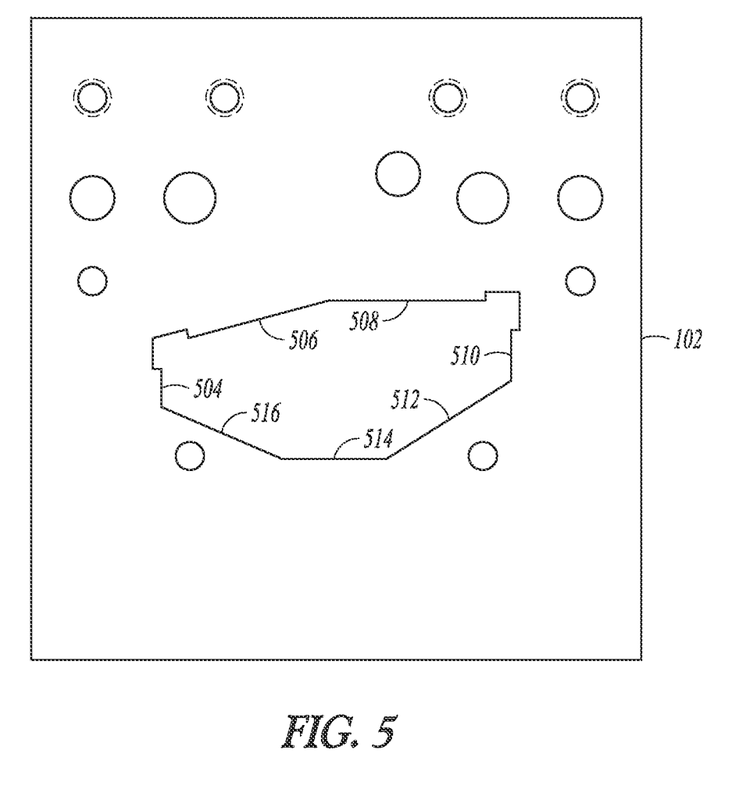
FIG. 5 shows a top view of a punch holder according to one embodiment.

FIG. 5 shows a top view of punch holder 102. Punch holder 102 includes a guiding portion 501 defined by side walls 504, 506, 508, 510, 512, 514, and 516. Guiding portion 501 is dimensioned to guide punch block 116. Referring to FIG. 2, a lower portion 204 of punch holder 102 is cut-out providing room for punch base 114 (FIG. 1) to move up and down with the side walls of punch block 116 guided and aligned by the side walls 504-516 of guide area 501 of punch holder 102. As noted above, punch holder 102 provides a guiding lead-in, or pre-alignment, for punch 118. Guide area 501 guides punch block 116 such that punch 118 is centered within guide hole 220. Since guide hole 220 and die hole 210 are formed at the same time (e.g. as a single original hole), they are aligned so that punch 118 is also centered within die hole 210. This bearingless system allows for better tolerances and allows the punch to be controlled within tolerances of 0.00005" to 0.000200". One example foil punched by the apparatus can be a 100 micron (0.004 inch) thick aluminum foil. Accordingly, the present system can provide a 1.25% to 5.0% clearance vs. thickness ratio.

Figure 6A:
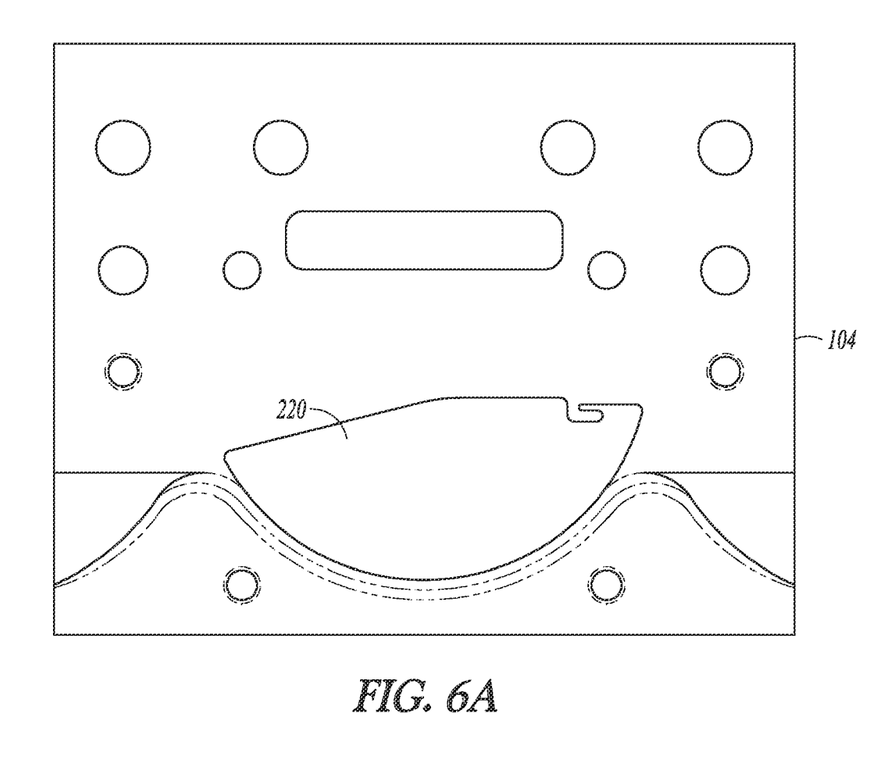
FIGS. 6A and 6B show a top view and side view of a punch guide according to one embodiment.
Figure 6B:
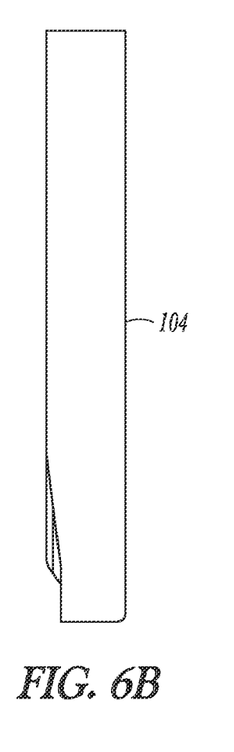

FIGS. 6A and 6B show a top and side view respectively of punch guide 104. As noted above, in one embodiment punch guide 104 can be formed of carbide from a single block of base material along with die 106. A front portion 602 is slightly tapered to allow easier access of the sheet of material to be punched. In one embodiment, punch guide hole 220 is wire cut to be 0.00005" larger than the outer perimeter of punch 118. Referring to FIG. 2, as punch 118 is driven by punch block 116 towards punch guide 104, lower portion 204 of punch holder 102 guides punch block 116. Then punch 118 enters punch guide hole 220.

Figure 7A:
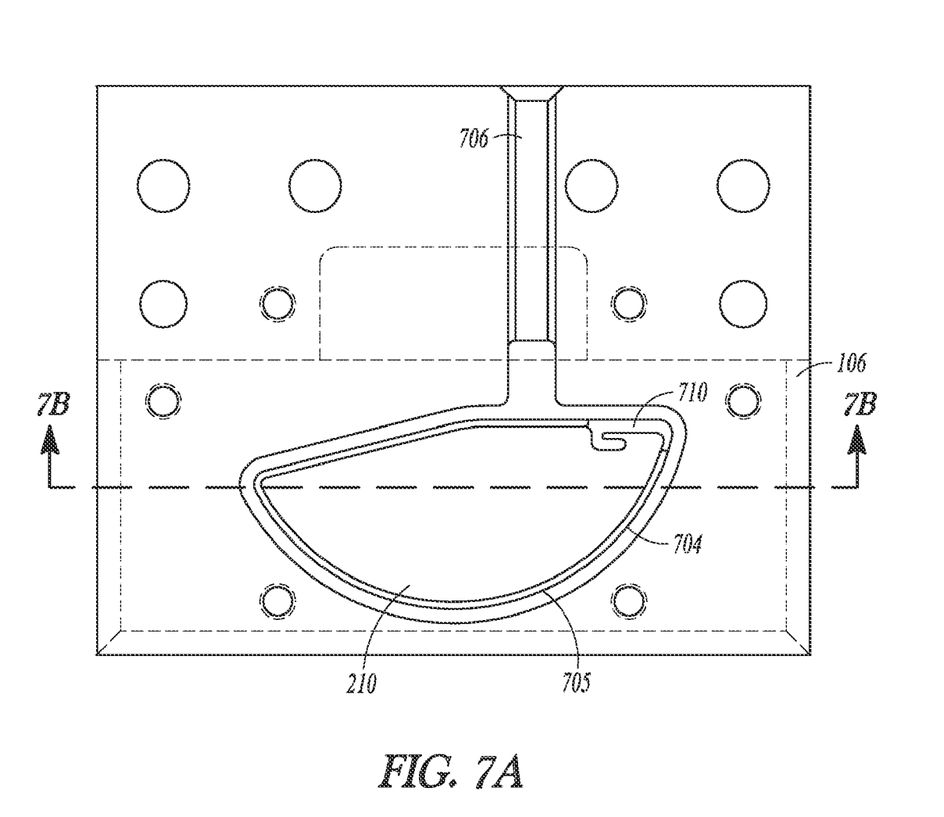
FIGS. 7A and 7B show a top view and side view of a die according to one embodiment.
Figure 7B:
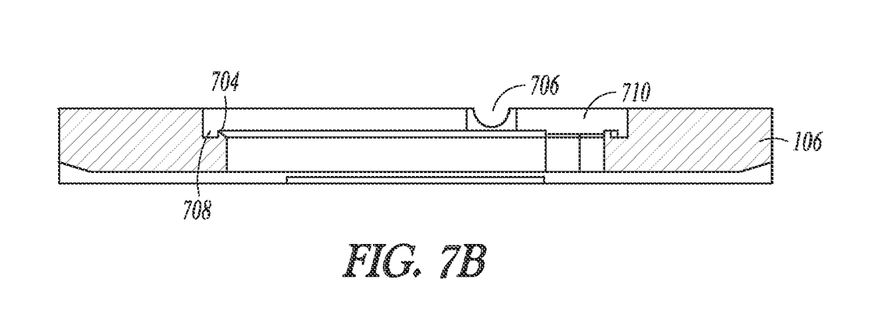

FIGS. 7A and 7B show a top and side section view of die 106. Die 106 includes die hole 210. As noted above, in one example, die hole 210 is cut to be 0.00005" larger than the outer perimeter of punch 118 and can be formed during the same cutting operation as guide hole 220 of punch guide 104. Hole 210 thus includes a surface which is 0.00005" larger than the outer perimeter of punch 118. As noted above, this distance can vary depending on the EDM equipment used. In one embodiment, this clearance distance between the punch and the die is constant all the way around the perimeters of the two members. Thus, clearance between the punch perimeter and the die hole 210 is substantially constant around the entire perimeter of the punch surface. In one example, the clearance is substantially constant within a tolerance of +/−0.00050 inches. Providing a constant clearance helps reduce edge cracking and corner cracking of the brittle material being punched.

Die 106 also includes a lubrication dam 704 around the periphery of hole 210 defined by a ridge 705. A feed conduit 706 feeds lubricant to a lubrication reservoir area 708. A pre-selected area 710 is open (i.e. ridge 705 does not extend through area 710) such that lubrication delivered via conduit 706 is directed towards hole 210 only through opening 710, while dam 704 holds the lubrication back around the rest of the periphery. In one example, the opening 710 is less than ¼ of the total perimeter length of the periphery of the die hole.

The lubricant can be a lubricating fluid such as a fluorinated or partially fluorinated alkane and amine, a perfluoroether, or a hydrofluoroether material. In one embodiment, a Flourinert™ fluid such as Flourinert™ fluid FC-43 can be used. One benefit of using one of the fluids mentioned above is that the fluids are compatible with the capacitor chemistry and thus there is no cleaning of the capacitor foil required following punching with these lubricants.

In use, as a foil is cut between punch 118 and die 106, lubricant is directed to the predetermined location 710. In one embodiment, this pre-determined location is lubricated because the material being cut is a dual material, for example, an aluminum anode layer having a brittle 70% $Al_2O_3$ section and a pure aluminum section.

Figure 7C:
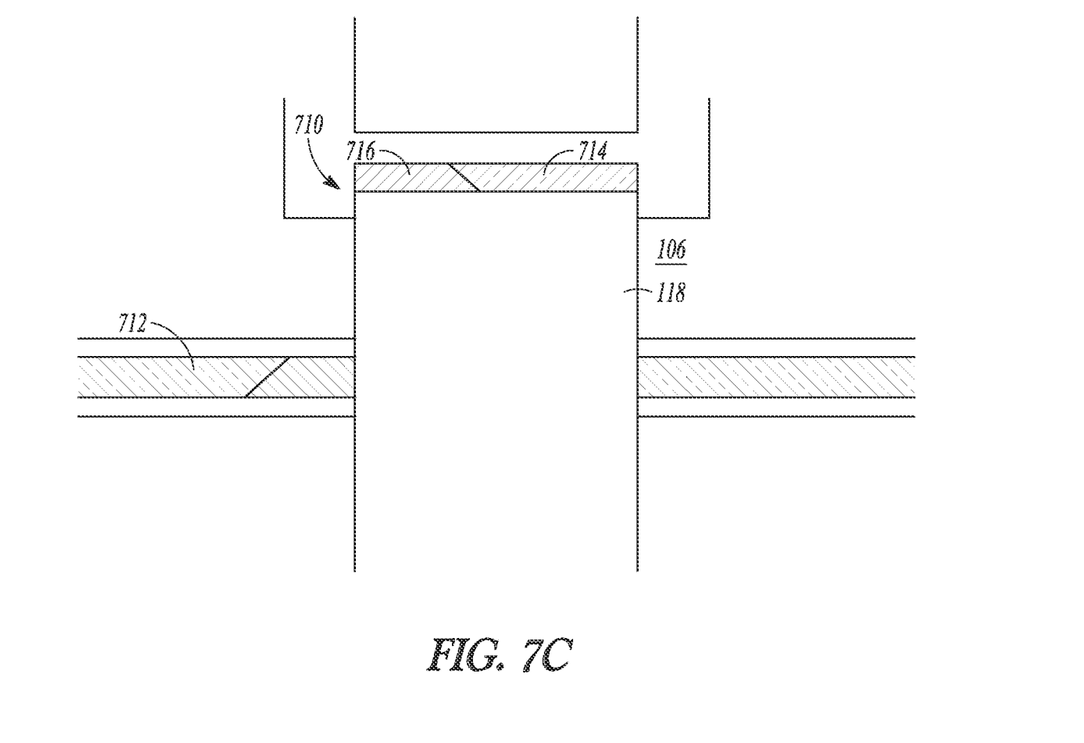
FIG. 7C shows a schematic representation of punch and die set 100 cutting a sheet of metal, in accordance with one embodiment.

Referring to FIG. 7C, in one example an aluminum sheet 712 can have a thickness of about 100 micrometers (0.004 inches). Other embodiments can have sheets having thicknesses ranging between 50 micrometers and 600 micrometers. Sheet 12 can include an aluminum oxide portion 714 and an aluminum portion 716. The lubricant is concentrated on the periphery of the die hole at the location 710 where the punch cuts through the aluminum portion. Soft materials such as aluminum tend to gall and stick to the punch tip or the guide inner diameter. Use of a lubricant will increase the life of the punch and die.

Figure 8:
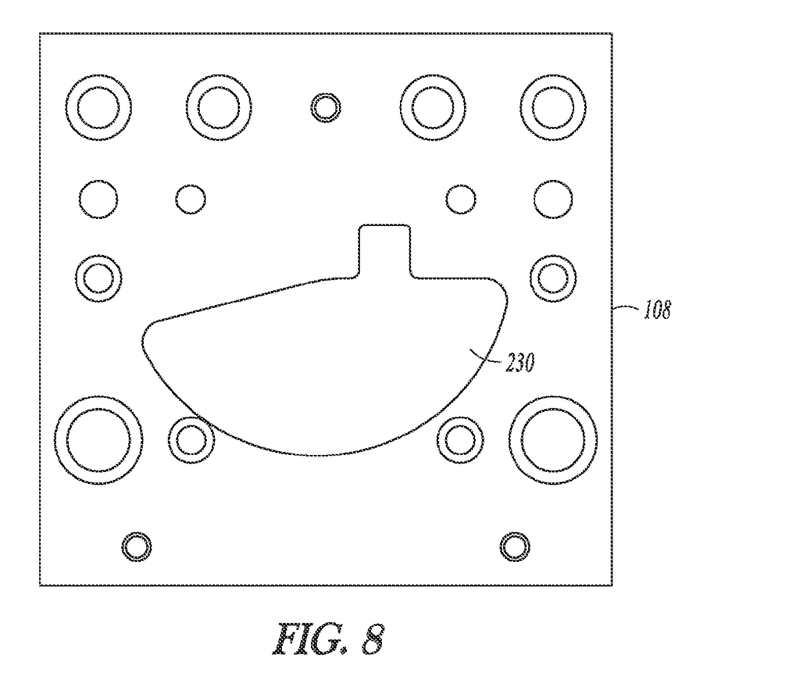
FIG. 8 shows a top view of a die holder according to one embodiment.

FIG. 8 shows die holder 108 according to one embodiment. Die holder 108 is attached to die 106 (FIG. 2). A hole 230 in die holder 108 is dimensioned to be larger than the cutting edge periphery of die 106 hole 210. In one example, this allows vacuum block 120 to enter hole 230 to retrieve a cut part from the surface of punch 118.

Figure 9:
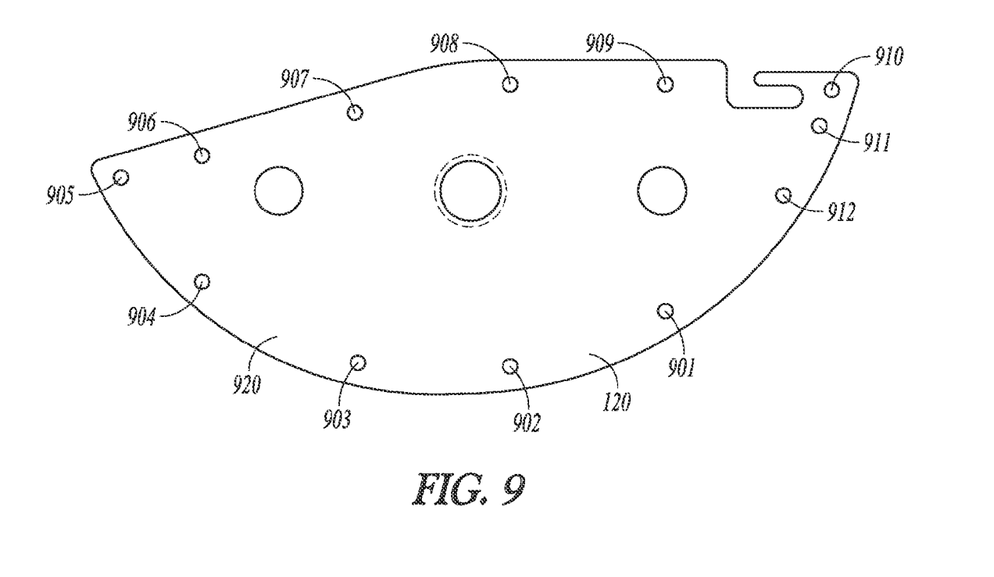
FIG. 9 shows a bottom view of a vacuum block according to one embodiment.

FIG. 9 shows a pick-up member such as a vacuum block 120 according to one embodiment. Vacuum block 120 is used to grab the cut foil off of the surface of punch 118 after the foil has been cut. Vacuum block 120 includes a plurality of ports 901-911 located on a bottom surface 920 of block 120 near the outer periphery of the block. Ports 901-911 are the ports for air channels extending through block 120 which are in communication with the vacuum manifold 122 (FIG. 1). As will be discussed below, vacuum manifold includes two independent vacuum ports located so as to apply the vacuum on selected ones of ports 901-911. For example, in one embodiment, ports 901-909 are in communication with one of the vacuums of manifold 122 and ports 910-912 are in communication with the other vacuum. This two-part pick-up prevents peeling of the dual material electrode layer (see FIG. 7C, for example). For example, ports 910-912 grab onto the pure aluminum tab portion 716 while ports 901-909 grab onto the $Al_2O_3$ portion 714. If the layer were allowed to peel off of the punch face, it allows the tab to rip off.

Figure 10A:
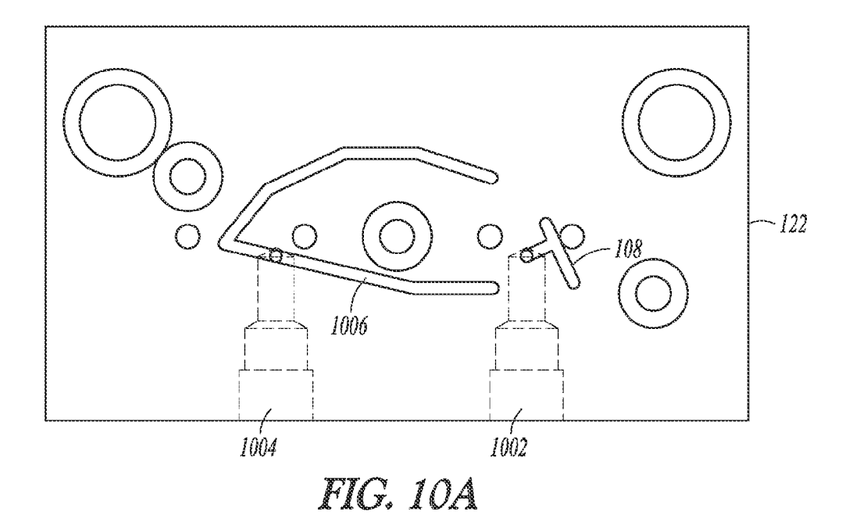
FIGS. 10A and 10B show a bottom and a top view of a vacuum manifold according to one embodiment.
Figure 10B:
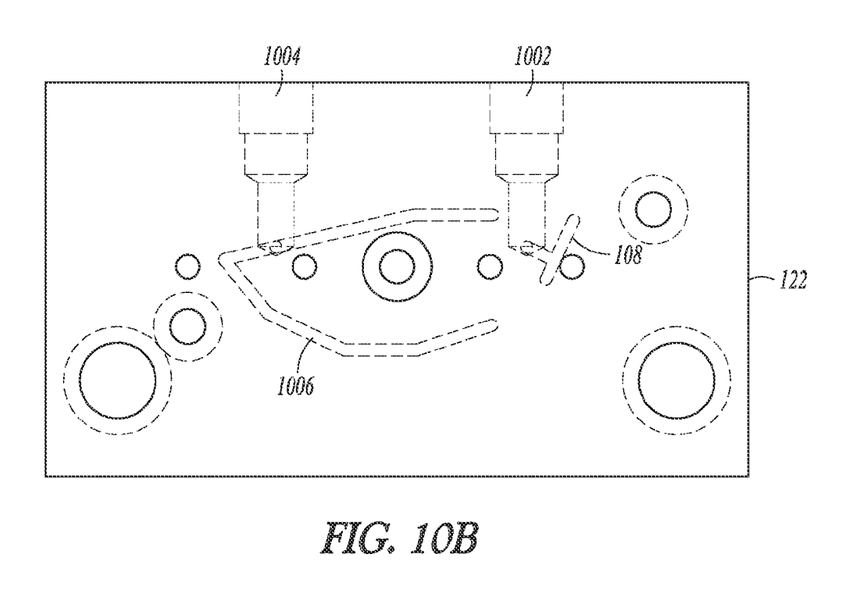

FIGS. 10A and 10B shows a top and bottom view of vacuum manifold 122 according to one embodiment. In one example, manifold 122 includes two or more independent vacuum inputs 1002 and 1004. As noted above, inputs 1002 and 1004 can be in communication with different outlet portions of the manifold. For example, input 1002 is in communication through channels with a first outlet 1008 which is exposed on the surface of the manifold. Input 1006 is in communication with a second outlet 1006. Referring to FIG. 9, outlet 1006 is in communication with ports 901-909 providing a first vacuum zone and outlet 1008 is in communication with ports 910-912 providing a second vacuum zone.

Referring again to FIG. 2, in one embodiment of forming a capacitor layer using punch and die set 100, an aluminum sheet is provided and placed into the C-shaped gap 202 so that the sheet is between punch 118 and die 106. Punch 118 is actuated and a piece is punched out of the sheet of material. It is noted that there is no stripper plate between punch guide 104 and die 106. (A stripper plate is a mechanical hold-down device applied to the workpiece during the punching process.) Thus, gap 202 is a permanent distance between the guide 104 and die 106 with only punch 118 entering and crossing the gap. Thus the sheet is cut without applying any compression forces on the sheet before the punch contacts the sheet. This non-compression system provides for better edge quality and increases the life of the tools.

In one embodiment, die 118 is actuated upwardly and the punched capacitor layer is picked out of the top or the back side of die 106. A top surface of the punch extends through the die above the second side of the die before the electrode layer is taken off of the punch. The aluminum sheet can be an elongated sheet for forming a plurality of electrodes from the sheet. The sheet can be controlled so it enters through the front of C-shaped gap 202, the electrode is punched, the sheet is pulled out and translated to the left or right, and then the sheet is pushed in through the front part of gap 202 and another part is formed.

In some embodiments, some examples of the subject matter discussed above can be incorporated into other foil punching methods and apparatus, such as for battery electrodes.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of forming an electrode layer for a flat capacitor, the method comprising:
    placing a sheet between a punch and a die having a die hole;
    delivering a lubricant to a lubrication dam extending around a periphery of an upper end of the die hole, the lubrication dam including a ridge and a lubrication reservoir area behind the ridge, wherein the ridge does not extend around the entire periphery of the upper end of the die hole such that the ridge includes an opening to a protrusion extending into an interior of the die hole so as to direct the lubricant from the lubrication reservoir area behind the ridge to the protrusion extending into the interior of the die hole at the opening in the ridge; and
    actuating the punch to punch an electrode layer out of the sheet, wherein the location of the sheet at the ridge opening at the protrusion extending into the interior of the die hole receives more lubricant than sheet locations around the rest of the periphery not at the ridge opening.

2. The method of claim 1, wherein delivering a lubricant includes delivering a fluorinated or partially fluorinated fluid.

3. The method of claim 1, wherein placing a sheet includes placing a sheet having an aluminum oxide portion and an aluminum portion, the lubricant being directed to the periphery of the die hole at the location where the punch cuts through the aluminum portion.

4. The method of claim 1, wherein the opening is less than ¼ of the total perimeter length of the periphery of the die hole.

5. The method of claim 1, wherein the lubricant is compatible with a chemistry of the sheet such that the lubricant does not need to be cleaned off of the electrode layer after being punched.

6. The method of claim 1, wherein placing the sheet between the punch and the die includes placing the sheet between the punch and the die, the punch guided by a punch guide, there being no stripper plate between the punch guide and the die.

7. The method of claim 1, wherein actuating the punch includes actuating the punch upwardly.

8. The method of claim 1, further comprising picking the punched electrode layer out of a back side of the die.

9. The method of claim 8, wherein a top surface of the punch extends through the die above the second side of the die before the electrode layer is taken off of the punch.

10. The method of claim 8, wherein the punched electrode layer includes an aluminum oxide portion and an aluminum tab portion and wherein picking the punched electrode layer includes picking the electrode layer off of the punch using a vacuum member having two independent vacuum ports, one port located to attach to the aluminum oxide portion and one port located to attach to the aluminum tab portion.

11. The method of claim 1, wherein the electrode layer is punched out of the sheet without applying any compression forces on the sheet before the punch contacts the sheet.

12. A method of forming an electrode layer for a flat capacitor, the method comprising:
placing a sheet having a distinct aluminum oxide portion and a distinct aluminum portion between a punch and a die having a die hole, the die hole including an open upper end and defining a periphery around the open end;
delivering a lubricant to a lubrication dam located at the periphery of the open upper end of the die hole, the lubrication dam including a ridge and a lubrication reservoir area behind the ridge, wherein the ridge does not extend around the entire periphery of the upper end of the die hole such that the ridge includes an opening to a protrusion extending into an interior of the die hole so as to direct the lubricant to the opening in the lubrication dam ridge to the protrusion extending into the interior of the die hole at the location where the punch will cut through the aluminum portion of the sheet and such that the protrusion at the ridge opening to the die hole on the periphery of the open upper end of the die hole has more lubricant than other locations on the periphery of the open upper end of the die hole; and
actuating the punch to punch an electrode layer out of the sheet, wherein the location of the sheet at the lubrication dam ridge opening receives more lubricant than sheet locations not at the ridge opening.

13. The method of claim 12, wherein delivering a lubricant includes delivering a fluorinated or partially fluorinated fluid.

* * * * *